Sept. 10, 1957    G. F. SMITH    2,805,636
SHAFT POSITION INDICATING DIAL
Filed Dec. 20, 1954    2 Sheets-Sheet 1

GEORGE F. SMITH
INVENTOR.

Huebner, Beehler, Worrel & Herzig.
BY
Warren T. Jessup
ATTORNEYS.

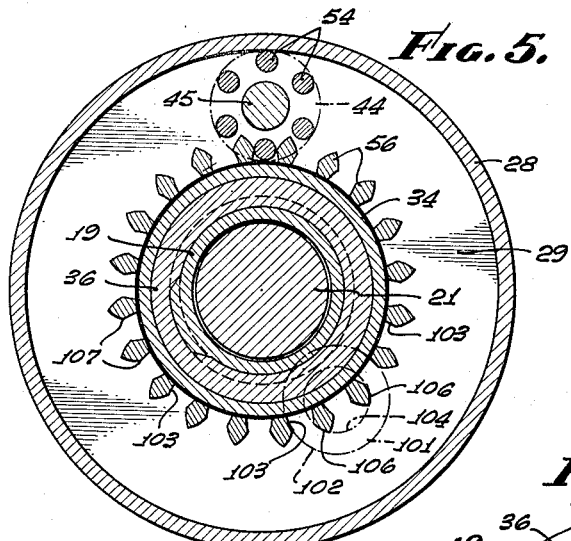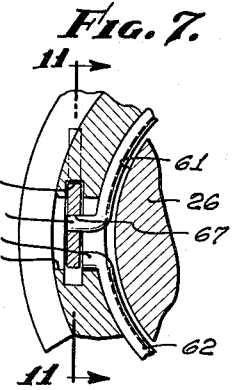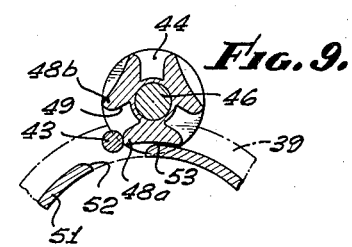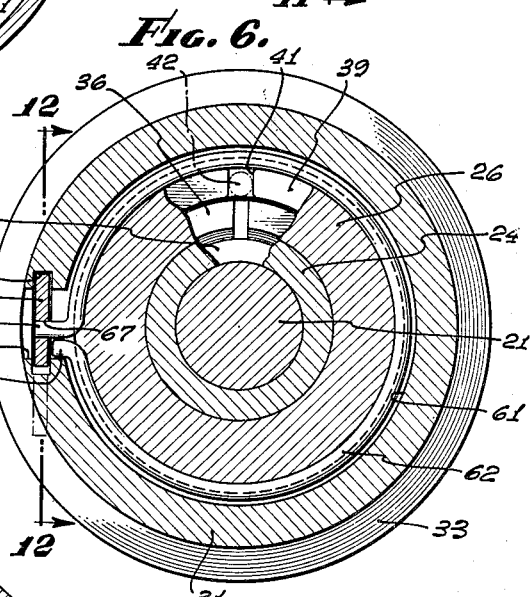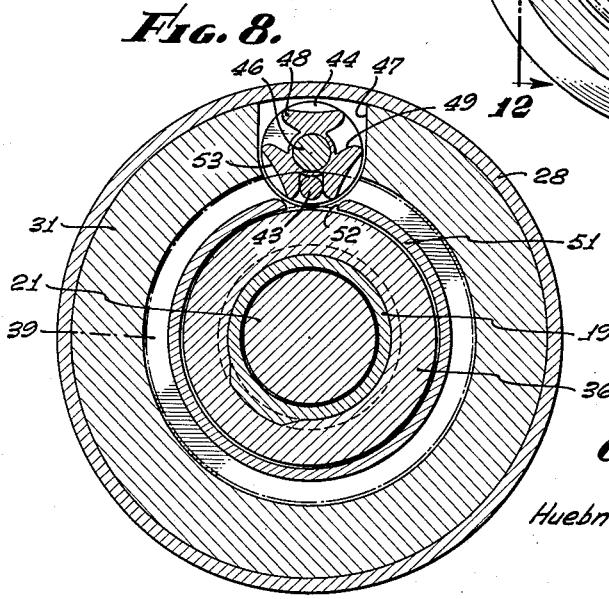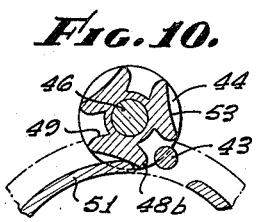

United States Patent Office 2,805,636
Patented Sept. 10, 1957

2,805,636

SHAFT POSITION INDICATING DIAL

George F. Smith, El Monte, Calif.; Lila Smith, executrix of the estate of said George F. Smith, deceased, assignor to Robert L. Gach, Claremont, Calif.

Application December 20, 1954, Serial No. 476,430

5 Claims. (Cl. 116—115)

This invention relates to dial apparatus for indicating the rotary position of a shaft, and has particular reference to such an apparatus employing two dials, one of which is intermittently moved with each full revolution of the other, so that the dials occupy a decimal relation with respect to each other.

It is an object of this invention to provide an improved multiple dial apparatus of such design that it may be made very, very small.

It is another object of this invention to provide a miniature, multiple-dial, shaft position apparatus which may be manufactured to very precise and accurate readings, so that a given position of the shaft will always be indicated by a given, precise reading of the dials.

In the present apparatus, the rotative axis of one of the dials is fixed with respect to a bushing or boss through which the shaft to be indicated extends. The other dial is mounted rigidly to the shaft. Even with precision manufacture of the type here involved, manufacturing tolerances are such that there may be slight misalignment between the axis of the shaft and the axis of the dial which is fixed by the boss. Such tolerances may enter, for example, in an off-center drilling of a bore through the bushing or boss, the bore constituting the bearing for the shaft. It is an object of this invention to provide means for compensating for such slight axial misalignment between the two dials of the apparatus, without introducing inaccuracy or backlash into the reading of the dials.

In the construction of shaft position indicating apparatus wherein one rotary member, such as a dial, is intermittently moved by another dial, an escapement mechanism is generally provided which is brought into play with each full revolution of one dial to cause a partial revolution of the second dial. The indicia on both dials index against a line fixed to the panel. It is another object of this invention to provide an escapement design by which the zero lines on both dials are accurately aligned with the fixed index line at the zero position of the shaft.

The escapement mechanism can become quite cumbersome and can add measureably to the size of the apparatus. It is an object of this invention to minimize the volume required for translating intermittent motion from one dial to another through such an escapement mechanism.

It is often convenient to lock the shaft in a predetermined set position. To this end, it is an object of this invention to incorporate, in an indicating dial as described above, a simple effective clamp or lock mechanism by means of which the dials forming the indicating apparatus may be clamped stationarily, thereby to clamp the shaft, without adding to the bulk of the apparatus.

It is a further object of this invention to provide a multi-dial indicating apparatus in which the greater portion of the apparatus is clamped and mounted by the panel through which the shaft extends, thereby minimizing the load which is placed on the shaft, with consequent lessening of danger of the dials coming loose from the shaft during extended usage and vibration.

In accordance with these and other objects which will become apparent hereinafter, a preferred form of the present invention will now be described with reference to the accompanying drawings wherein:

Figure 5 is a cross section taken on line 5—5 in Figure 3.

Figure 6 is a cross section taken on line 6—6 in Figure 3.

Figure 7 is a fragmentary cross section taken in the same plane as Figure 6 and illustrating the apparatus in a different position of adjustment.

Figure 8 is a cross section taken on line 8—8 in Figure 3.

Figure 9 is a fragmentary cross section taken in the same plane as Figure 8 illustrating the parts in a different position.

Figure 10 is a fragmentary cross section similar to Figure 9 illustrating the parts in a still different position.

Figure 1:
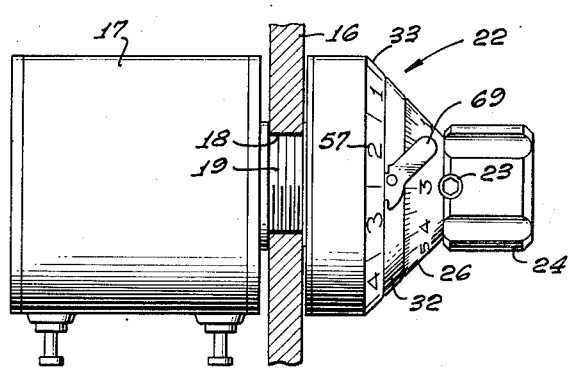
Figure 1 is a side view of the apparatus of the present invention shown mounted to a panel and adapted to actuate a potentiometer shaft.

Referring to the drawings, 16 designates a housing or panel to which is mounted a potentiometer 17. Extending from the potentiometer 17 through a hole 18 in the panel 16 is a threaded boss 19 having an axial bore through which extends a shaft 21 that serves to actuate or position the slider of the potentiometer 17. The shaft 21 and slider are positioned, and such position is indicated, by the dial mechanism 22 forming the subject of the present invention.

Secured over the end of the shaft 21 by a pair of perpendicularly disposed set screws 23 is an actuating knob 24. Press fitted over a reduced inner end of the knob 24 is a bezeled inner dial 26 which, together with the knob 24, constitutes an actuating or driving means for the shaft 21. The outer periphery of the dial 26 is divided into ten arcuately equal divisions indicated by the numbered lines 27, each of which is in turn divided into ten equal divisions.

Figures 3, 4, 13:
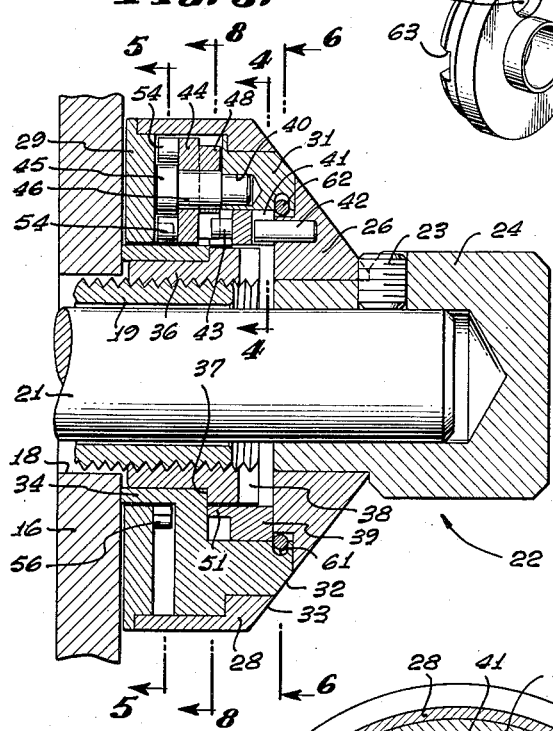
Figure 3 is a fragmentary longitudinal section taken on line 3—3 of Figure 2.
Figure 4 is a fragmentary cross section taken on line 4—4 of Figure 3.
Figure 13 is a perspective view of one of the elements of the mechanism.

Adjacent the panel 16 is disposed a rotatably mounted outer dial composed of an outer dial ring 28 into which is press fitted a circular plate 29. The outer dial ring 28 is rotatably held in position over the boss 19 by a stator in the form of a stationary index member or ring 31 having a bezeled annular face 32, which is flush with the bezeled face of the inner dial 26 and the bezeled face 33 of the outer dial 28. The stator 31 has a cylindrical flange 34 which extends through an axial opening in the plate 29 into butting relation with the panel 16, as shown in Figure 3. The stator 31 is clamped firmly against the panel 16 by a mounting nut 36 threaded to the boss 19 and having a shoulder 37 which engages a corresponding shoulder on the stator 31 at the end of the flange 34 to hold the stator firmly against the panel 16. Diametric notches 38 are formed in the end of the nut 36 to provide a means whereby a wrench may be engaged with the nut 36. By the structure thus described, the outer dial ring 28 with its rear plate 29 is restrained against axial movement, but is free to rotate on the flange 34 coaxially of the boss 19; the stator 31 is clamped firmly against the panel 16. This requires the set screws 23 to secure only the knob 24 and inner dial 26, thereby lessening the vibration stress on the screws 23 and shaft 21.

Interposed between the inner dial 26 and the stator 31 is a self-aligning coupling ring 39, which is freely rotatable in a cavity formed by the stator 31, the nut 37 and the dial 26, as shown in Figure 3. The ring 39 is free for slight lateral shifting to accommodate for any slight axial misalignment between shaft 21 and stator 31. The coupling ring 39 has a radial notch 41 formed therein in which resides a pin 42 fixed in the dial 26 and extending outwardly therefrom into the notch 41. Also formed on the ring 39, in line with the notch 41, is a pin 43 which forms part of the escapement mechanism by means of which each full revolution of the dial 26 imparts an intermittent partial revolution to the outer dial 28.

Such intermittent motion is imparted by means of an escapement gear 44 journalled on a shaft 46 pressed into a hole 40 formed in the stator 31, and having a head 45 which restrains gear 44 axially. The escapement gear 44 rides in a U-shaped recess 47 formed in the rear face of the stator 31 (Figure 8), which communicates at 50 through the stator 31, so that the forward face of the escapement gear 44 has access to the pin 43 on the coupling ring 39 and the rear face of the escapement gear 44 has access to the rear plate 29 of the outer dial 28.

On the forward face of the gear 44 are formed escapement gear teeth 48 which are adjacent radial notches 49 formed in the forward face of the gear 44. The notches 49 are adapted to be engaged intermittently by the pin 43 as the ring 39 is rotated by the inner dial 26. In addition to the pin 43, the coupling ring 39 carries a circumferential flange 51 having a gap 52 therein, the pin 43 being disposed radially outward of, and opposite, the gap 52, as shown in Figure 8. The flange 51 cooperates with the pin 43 to complete a 120° revolution of the escapement gear 44 with each full revolution of the coupling ring 39 (and dial 26). After the pin 43 and flange 51 have effected an escapement motion of the gear 44 and passed beyond the gear, the flange 51 also serves to keep the gear 44 locked in proper position against accidental rotation. This is effected by forming concave surfaces 53 on the front face of the gear 44, these surfaces being of radius approximately equal to that of the flange 51, so that they rest closely adjacent the flange, as shown in Figure 9 and therefore restrain the gear 44 against accidental rotation.

As shown in Figure 9, the ring 39 rotates to bring the pin 43 into engagement with a tooth 48 on the gear 44. Those teeth 48 which are first encountered by the pin 43 will be referred to herein as leading teeth and designated 48a, while those teeth on the opposite side of the notches 49 will be designated trailing teeth 48b. Engagement of the pin 43 against a leading tooth 48a, which has been held in position by registration of the concave surface 53 with the flange 51, imparts a turning moment or torque to the gear 44 about its shaft 46; turning of the gear 44 is permitted by the fact that, by this time, the gap 52 in the flange 51 has come opposite the leading tooth 48a. The gear 44 thus turns and the pin 43 slides into engagement in the notch 49. At the half-way point in the escapement motion the parts occupy the position shown in Figure 8.

Because of the stringent space limitations, it is desirable to position the escapement shaft 46 as close as possible to the flange 51 and this requirement limits the effectiveness of the pin 43 so that it is unable to complete an escapement movement, i. e., a 120° turn of the gear 44. Thus, when the pin 43 departs from driving engagement with the gear 44, the parts are substantially in the position shown in Figure 10. At this moment, the flange 51 comes into play by engaging the trailing tooth 48b, thus continuing the rotation of the gear 44 until a full escapement turn of 120° has been imparted to the gear 44, bringing the gear into the position shown in Figure 9. The ring 39 then continues its rotation and the pin 43 makes a complete revolution before it is again brought into engagement with the gear 44. During this portion of the cycle, the gear 44 is quiescent, being held in position by the flange 51, as described hereinbefore.

The rear face of the gear 44 is provided with six circular pin teeth 54 (Figure 5) which mesh with pointed pin teeth 56 extending from the plate 29 parallel to the axis of the shaft 21. The inner edges of the teeth 56 ride on a circle and lie closely adjacent the cylindrical flange 34 of the stator 31, as shown in Figure 5. In the embodiment shown, there are six teeth 54 and twenty teeth 56; thus each 120° revolution of the escapement gear 44 causes two of the teeth 54 to pass in engagement with a corresponding two of the teeth 56, with consequent rotation of the outer dial 28 through one-tenth of a revolution, or 36°.

The points of the teeth 56 extend radially outward beyond the engaged tooth 54 (Figure 5). Then teeth 56 are generated by a hollow cutter shown in phantom at 101, the outer face 102 of which undercuts the base of each tooth slightly as shown at 103, while the inner face 104, cuts the rounded point of the tooth 106. The distance between opposed cusps 107 is made a few thousandths of an inch greater than the diameter of teeth 54.

In a typical construction the radius of the pin gear 54, i. e., the distance from the center of the shaft 46 to the center of a tooth 54 was made .085 inch. Diameter of pin 54 was .041 inch. Radius of gear 56, i. e., from center of shaft 21 to cusp points 107, was made .274 inch.

On its exposed bezeled face 33, the outer dial 28 is provided with ten equally spaced numerals 57. These numerals register with a radial index line 58 formed on the exposed exterior bezeled surface 32 of the stator 31. The index line 58 is also used to index the lines 27 on the dial 26.

Figures 11, 12:
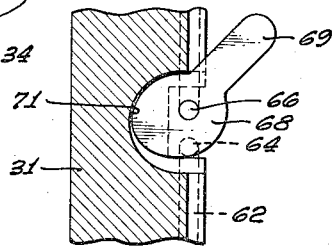
Figures 11 and 12 are fragmentary sections taken on line 11—11 in Figure 7 illustrating the locking mechanism in two different positions of operation.

It is desirable to be able to clamp the indicating dials in any position. This is effected by providing a means for clamping the inner or units dial 26; this automatically clamps the outer dial 28 through the heretofore described locking action of the escapement gear 44. Such a clamp is shown particularly in Figures 6 and 7, and is effected by providing an interior groove 61 in the stator 31. In the groove 61 is disposed an annular resilient clamp 62. A generally radial passageway 63 is formed in the stator 31 and the two ends of the clamp 62 are turned radially outward into this passageway 63. One of these ends 64 is hooked over an edge of the passageway 63. The other end 66 is made somewhat longer and is extended through a hole 67 formed in a clamping cam 68 (Figure 11). The cam 68 is provided with a manually operable handle member 69 and is oscillatably mounted in a cam guide-way 71 formed transversely of the passageway 63. The cam 68 is somewhat oval shaped and the mounting hole 67 for the clamp end 66 is off-center of the cam 68. The cam is so mounted that it can be oscillated manually thru approximately 100°. When the cam is in the position shown in Figures 7 and 11, the ends 64 and 66 of the clamp 62 are spread apart, thereby moving the clamp 62 outwardly into engagement with the groove 61 and away from the dial 26; this leaves the dial free to turn. When the cam 68 is oscillated or rotated to the position shown in Figures 6 and 12, the two ends 66 and 64 are brought together, thereby ensmalling the clamp 62 and clamping it firmly about and against the inner dial 26, as shown in Figure 3. Since the clamp 62 is prevented from rotation by its engagement in the passageway 63 and in the cam 68, this clamping action likewise firmly anchors the dial 26 against rotation.

In the clamping movement from the position shown in Figure 11 to that shown in Figure 12, the extended end 66 of the clamp 62 and the protruding point of the oval cam 68 are moved past dead-center points, so as to lock the cam against accidental unlocking motion. The locking action is enhanced by the oval shape of the cam 68, as shown in Figure 12, this bringing the major diameter of the cam 68 into firm engagement against the side of the cam guide-way 71 and past dead center.

Figure 2:
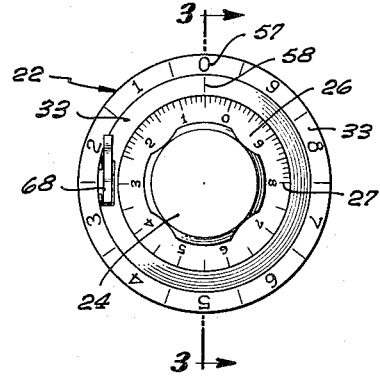
Figure 2 is a front view of the apparatus of Figure 1.

As shown in Figure 2, the locking mechanism 59 is displaced approximately 90° to the left from the index 58 on the stator 31, the dial generally being mounted so that the index 58 points upward. This allows the knob 24 to be set with the right hand, and locked with the left hand.

While the instant invention has been shown and described herein in what is conceived to be the most practical and preferred embodiment, it is recognized that departures may be made therefrom within the scope of the invention which is therefore not limited to the details disclosed herein, but is to be accorded the full scope of the claims.

What is claimed is:

1. Intermittent motion mechanism comprising a driving member having a cylindrical flange and being rotatably mounted about the axis of said flange, said flange having a gap therein, a pin on said driving member disposed radially outward of said gap, an escapement gear rotatably mounted on an axis parallel to the axis of said driving member and having a plurality of radial notches engageable by said pin, the periphery of said gear intermediate said notches being concave and lying closely adjacent the periphery of said flange during the stationary portion of the intermittent cycle of said gear, said gear having a trailing tooth adjacent the trailing edge of each notch, said trailing teeth being engaged by said flange after departure of said pin from a given notch to complete the escapement motion of said gear.

2. Mechanism for indicating shaft position, adapted to be secured to a housing having a main shaft extending therefrom and a threaded boss circumjacent said shaft, comprising: an annular stationary member adapted to be disposed around said boss, a nut bearing against said stationary member and adapted to be screwed on to said boss to stationarily clamp said member, a rotatable outer dial ring disposed coaxially over said stationary member and having gear teeth, inner dial means mounted to said shaft radially within said stationary member, escapement pin means rotatable by said inner dial means; an escapement shaft journalled in said stationary member parallel to said main shaft, an escapement gear on one end of said escapement Geneva type shaft engageable by said escapement pin, gear members on the other end of the said escapement shaft engageable with the gear teeth on said outer dial ring, said stationary member having an annular exterior portion adjacent the exterior surfaces of said inner dial means and said outer dial ring and bearing an index registrable with indices on said ring and dial means.

3. Shaft position indicating mechanism comprising a stationary member, an index on said stationary member, an inner dial member adapted to be secured to a shaft, an outer dial member rotatably mounted coaxially with respect to said inner dial member and disposed radially outside of said stationary member, and coupling ring means having notch-and-pin engagement with said inner dial member, and pin means engageable with escapement means, the latter being pivotally mounted on said stationary member and having tooth means engageable with said inner dial member and with said outer dial member to transmit rotation of said inner dial member to said outer dial member; said coupling ring means transmitting rotation of said inner dial member to said escapement means, and being mounted for free rotation with respect to the axis of the shaft and being mounted for limited movement in all other directions, thereby to permit slight misalignment between the shaft and said stationary member.

4. Mechanism according to claim 3 wherein said stationary member has an annular groove, and including a clamping member seated in said groove and substantially completely encircling said inner dial member, one end of said clamping member being stationarily mounted, a clamping lever pivotally mounted with respect to said stationary member, the other end of said clamping member being connected to said clamping lever, whereby pivoting of said clamping lever effects contracting of said clamping member about said inner dial member to secure the same against rotation.

5. Mechanism according to claim 4 wherein the said other end of the clamping member is pivotally connected to the clamping lever, said clamping lever is rotatably mounted in a cavity in said stationary member and has a cam surface cooperating with the wall of said cavity to effect said contracting of said clamping member.

References Cited in the file of this patent

UNITED STATES PATENTS

| | | |
|---|---|---|
| 2,075,481 | Thomas | Mar. 30, 1937 |
| 2,336,163 | Bullard | Dec. 7, 1943 |
| 2,343,244 | Rose | Mar. 7, 1944 |
| 2,491,403 | Wills | Dec. 13, 1949 |
| 2,678,703 | Williams et al. | May 18, 1954 |
| 2,682,934 | Howarth | July 6, 1954 |
| 2,746,417 | McCord | May 22, 1956 |